2,880,992

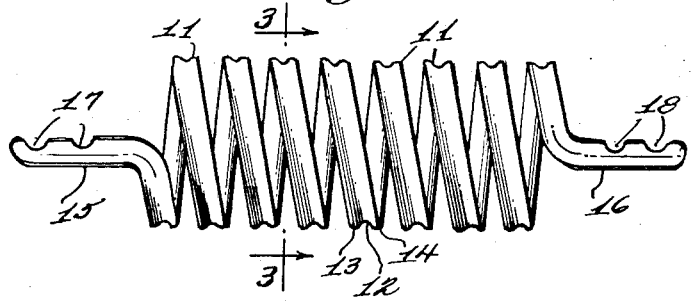
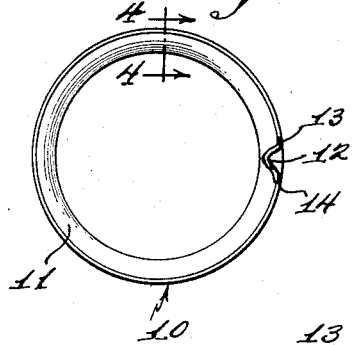
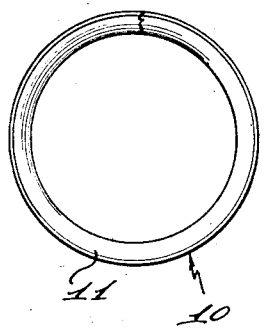
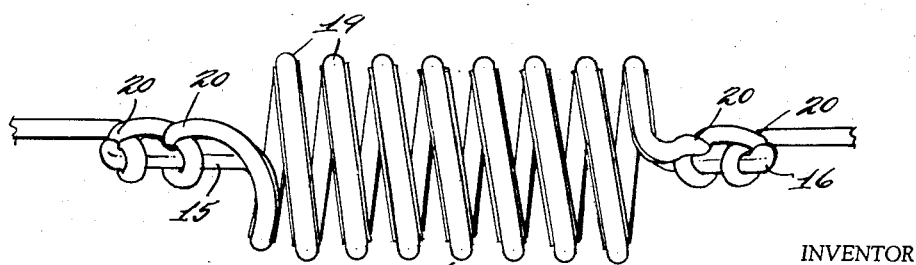
INVENTOR
SAUL GUBERNICK
BY Kimmel & Crowell
ATTORNEYS United States Patent Office 2,880,992
Patented Apr. 7, 1959

CABLE SUPPORT AND RETRACTOR

Saul Gubernick, Los Gatos, Calif.

Application November 15, 1957, Serial No. 696,811

4 Claims. (Cl. 267—74)

The present invention relates to cable supports and retractors, and particularly such devices on which the cable is detachably mounted.

The primary object of the invention is to provide a cable support and retractor which is positioned within the confines of a spirally wound cable and detachably secured thereto.

Another object of the invention is to provide a spiral coil cable support and retractor which is resilient and will retract the cable under spring tension.

A further object of the invention is to provide a resilient cable retractor and support which is inexpensive to manufacture, simple to use, and which can be attached to the cable with a minimum of effort.

Other objects and advantages will become apparent in the following specification when considered in the light of the attached drawings, in which:

Figure 1 is a side elevation of the invention.

Figure 2 is an end elevation of the invention.

Figure 3 is a vertical cross-section taken along the line 3—3 of Figure 1, looking in the direction of the arrows.

Figure 4 is a fragmentary enlarged transverse cross-section taken along the line 4—4 of Figure 2, looking in the direction of the arrows.

Figure 5 is a side elevation similar to Figure 1, illustrating a cable in position on the retractor.

Referring now to the drawings in detail wherein like reference characters indicate like parts throughout the several figures, the reference numeral 10 indicates generally a cable retractor and support constructed in accordance with the invention.

Many appliances are provided with electric cables for connecting the appliance to a source of electricity, and these cables are often too long for use under ordinary circumstances. Retractors of various types, including spring reels and complicated wire enclosing cages, have been provided in the past to retract the cable and hold it in retracted position. These prior art solutions to the problem are quite expensive and often cause damage to the surface on which they are lying due to scratching. The present retractor 10 is inexpensive to manufacture, and is positioned within the coils of the cable so that the retractor 10 does not contact directly the surface supporting it.

The retractor 10 comprises an elongated resilient strip spirally wound into a plurality of coils 11. The strip forming the retractor 10 has a concave central portion 12 and oppositely extending edge portions 13, 14 extending integrally therewith.

The retractor 10 has an offset end portion 15 integrally formed on one end thereof and an offset portion 16 integrally formed on the opposite end thereof. A pair of notches 17 are formed in the side edge of the offset end portion 15 adjacent the outer end thereof in spaced apart relation and a pair of notches 18 are formed in the side edge of the offset end portion 16 adjacent the outer end thereof in spaced apart relation.

A cable 19 is spirally wound around the coils 11 engaged in the concave central portion of the retractor 10, as shown in Figure 4. The opposite ends of the cable 19 are secured to the offset end portions 15 and 16 by means of a plurality of half hitches 20 which engage in the notches 17, 18, respectively, to secure the cable 19 in fixed position on the retractor 10.

In the use and operation of the invention, the cable 19 can be lengthened by pulling on the opposite ends thereof so as to flex the retractor 10 under its spring tension. On release of the pressure on the opposite ends of the cable 19, the retractor 10 returns to the positions illustrated in Figures 1 and 5, retracting the cable therewith.

Obviously, the retractor 10 can be built in various sizes and used for other than electric cables for such things as mooring ropes for boats, tether cables, tow ropes or cables for cars, etc.

The use of this invention will minimize a household hazard when used in conjunction with table lamps because small children frequently pull them down and hurt themselves or break the lamps.

The retractor may be made of plastic, metal, vulcanized rubber, or combinations of materials suitable for the purpose.

Having thus described the preferred embodiment of the invention, it should be understood that numerous structural modifications and adaptations may be resorted to without departing from the scope of the appended claims.

What is claimed is:

1. A cable retractor comprising an elongated resilient strip formed into a plurality of equal diameter axially aligned spiral loops, said strip having a concave central portion and oppositely extending side edges, an offset end portion integrally formed on each end of said strip and arranged parallel to the axis of said loops, said end portions each having a pair of notches formed in spaced apart relation in the side edges thereof in which to detachably secure a cable wound about said strip and engaging in said concave central portion.

2. A device as claimed in claim 1 wherein said strip is formed of an integral plastic material.

3. A device as claimed in claim 1 wherein said strip is formed of an integral metallic material.

4. A device as claimed in claim 1 wherein said strip is formed of vulcanized rubber.

References Cited in the file of this patent

UNITED STATES PATENTS

| | | |
|---|---|---|
| 1,164,563 | Yates | Dec. 14, 1915 |
| 2,704,782 | Ames | Mar. 22, 1955 |